United States Patent Office 2,982,708
Patented May 2, 1961

2,982,708

FUEL FOR NEUTRONIC REACTORS AND PROCESS OF MAKING

Bernard M. Abraham, Oak Park, and Howard E. Flotow, Bellwood, Ill., assignors to the United States of America as represented by the United States Atomic Energy Commission No Drawing. Filed Oct. 18, 1955, Ser. No. 541,316

7 Claims. (Cl. 204—193.2)

This invention deals with liquid fuel material for neutronic reactors.

A number of neutronic reactors are using the fuel in the form of a slurry and one preferred form is a suspension of the fuel material proper in a liquid metal. The homogeneous reactors and the liquid metal fuel reactors, for instance, use a low melting alloy in which the fissionable material is suspended. Details on liquid metal fuel reactors are published in Nucleonics, vol. 12, No. 7, pages 11–42, July 1954.

It has been tried to incorporate thorium, plutonium or uranium in metallic form or as a compound in a bismuth-lead-tin alloy; in particular has this been attempted with the oxides and nitrides of thorium and/or uranium. However, the dispersions obtained were not satisfactory as to stability either on account of agglomeration or poor wettability. Other liquid vehicles did not lead to a suitable fuel dispersion either.

It is an object of this invention to provide a liquid fuel suspension for neutronic reactors in which good wetting of the fuel by the liquid vehicle is obtained.

It is another object of this invention to provide a liquid fuel suspension for neutronic reactors in which agglomeration of the suspended material does not take place.

It is still another object of this invention to provide a liquid fuel suspension for neutronic reactors which is fluid at room temperatures as well as at elevated temperatures.

It is finally also an object of this invention to provide a liquid fuel suspension for neutronic reactors which is not corrosive.

These and other objects are accomplished by suspending fuel material such as uranium or certain compounds thereof in a liquid sodium-containing material. The liquid vehicle is either metallic sodium heated above its melting point or a sodium-potassium mixture, hereinafter referred to as "NaK." Uranium may be used in the form of natural uranium or uranium enriched in $U^{235}$. Compounds that were found suitable for the purpose of this invention are the dioxide, the nitride, silicide, and the carbide.

Up to 20% by volume of the fuel material could be suspended satisfactorily in the sodium-containing vehicle. It was found that the particle size of the fuel material should be not larger than 5 microns in order to obtain optimal results although a coarser material is also operative. A fuel material consisting of uranium dioxide of the maximum particle size of 5 microns suspended in NaK stayed completely suspended for 2½ minutes at 500° C. The uranium oxide could be suspended again even after it had been settled for 16 hours and after the NaK had cooled to room temperature.

The preferred way of obtaining the fuel compound in the desired particle size is grinding it in a ball mill for about 48 hours, using toluene as a lubricant.

It was furthermore found, in the case of uranium dioxide, that most uranium dioxide has an oxygen content slightly beyond the stoichiometric amount, for instance, as corresponds to the formula $UO_{2.05}$ or even $UO_{2.25}$, and that this "higher oxidized uranium dioxide" is considerably less suspendible than the uranium dioxide $UO_{2.00}$. This drawback was overcome by treating the higher oxidized uranium dioxide with hydrogen or another reducing agent at approximately 500° C. A reduction of the dioxide below $UO_{2.00}$ did not take place during this treatment. While untreated uranium dioxide suspended in NaK at room temperature can be separated, for instance, by centrifuging, hydrogen-treated uranium dioxide remains wetted by the NaK even after prolonged centrifugation. Also, it was found that after treatment with hydrogen the suspension was equally good and stable at room temperature and at 500° C., while untreated higher oxidized uranium dioxide suspended well at elevated temperatures only. The advantage of the hydrogen treatment is noticeable in particular with the oxide of a particle size above 5 microns.

In the following two examples are given to illustrate the invention.

*Example I*

Ball-milled uranium dioxide was subjected to a flow of hydrogen at between 550 and 600° C. for 2 hours whereby $UO_{2.00}$ was obtained; the ball-milled product contained 43.7% of particles less than 5 microns, 16.6% between 5 and 10 microns, and 39.7% greater than 10 microns. The hydrogen-treated uranium dioxide was mixed with NaK in an evacuated apparatus by stirring for 2 hours at room temperature. The uranium dioxide content of the suspension thus obtained was 16.2% by volume or 71.3% by weight. To the uranium dioxide there had been added a tracer concentration of neutron-irradiated uranium dioxide prior to the treatment with hydrogen; the activity of the slurry in various parts of the apparatus was an indication for the distribution of the uranium dioxide. The uranium dioxide content was measured in the NaK before stirring, during stirring and 16 hours after completion of the stirring. It was found that a substantial amount of the uranium dioxide was suspended in the NaK by the stirring operation and that a very small percentage of the suspended uranium dioxide settled down over the 16-hour period.

*Example II*

A 1-gram sample of uranium dioxide some of which had a particle size of less than 5 microns was obtained by fractional sedimentation in n-butyl alcohol. This material was irradiated in the Argonne CP–3 neutronic reactor for one hour, transferred to a mixing tube and outgassed at 300° C. Approximately 50 cc. of the eutectic sodium-potassium alloy was filtered into the mixing tube and the stirrer turned on. Practically no activity was detected above the bottom while stirring at room temperature, but when the tube was heated to 500° C. the uranium dioxide was found to be dispersed throughout the NaK. As soon as the stirrer was stopped, the particles settled out before a count could be taken. As has been mentioned above, when the particle size of all the dioxide was less than 5 microns, the latter remained suspended for 2.5 minutes.

The uranium dioxide was analyzed for its oxygen content and found to correspond to a formula between $UO_{2.03}$ and $UO_{2.04}$. It was assumed that the excess oxygen reacted with the NaK to form alkali metal oxides which agglomerated the small uranium dioxide particles.

The test was then repeated with uranium dioxide which had been treated with hydrogen as described above and had the formula $UO_{2.00}$. The oxide remained wet and well-distributed at room temperature even after prolonged centrifugation.

It will be understood that the process of this invention is not only useful for the preparation of slurries having a uranium compound suspended therein but that it is also applicable to the preparation of plutonium or thorium compounds-containing slurries.

It is also understood that the invention is not to be limited by the details given herein but that it may be modified within the scope of the appended claims.

What is claimed is:

1. A slurry for nuclear reactors comprising $UO_{2.00}$ suspended in a sodium-containing liquid metal.
2. The slurry of claim 1 in which the sodium-containing liquid metal is a sodium-potassium alloy.
3. A slurry for nuclear reactors comprising $UO_{2.00}$ which is enriched in $U^{235}$ and suspended in a sodium-containing liquid metal.
4. The slurry of claim 3 in which the sodium-containing liquid metal is a sodium-potassium alloy.
5. The slurry of claim 1 in which the maximum particle size of the fissionable material is 5 microns.
6. A process of preparing a slurry for neutronic reactors comprising grinding uranium dioxide so that its maximum particle size is 5 microns, treating said uranium dioxide particles with a reducing agent at elevated temperature whereby all of said uranium dioxide is converted to and secured as $UO_{2.00}$, and mixing the thus-treated uranium dioxide with a sodium-containing liquid metal.
7. The method of claim 6 in which the reducing agent is hydrogen, the elevated temperature is approximately 500° C., and the sodium-containing metal is a sodium-potassium alloy.

References Cited in the file of this patent

FOREIGN PATENTS 648,293     Great Britain _____ Jan. 3, 1951

OTHER REFERENCES

Nuclear Engineering Progress Symposium Series No. 12 (1954), vol. 50, pub. by Am. Inst. of Chemical Engineers, pp. 120–126.

ISC–258 Continuous Preparation of a Fine Uranium Oxide Slurry by W. R. Mullard et al., June 1952, pp. 5–10. (Available from AEC Technical Information Service, Oak Ridge, Tenn.)

July 1954, Nucleonics, pages 14, 15, 24, 25.